United States Patent
Stanford et al.

(10) Patent No.: US 6,453,084 B1
(45) Date of Patent: Sep. 17, 2002

(54) SYSTEM AND METHOD FOR BEAM-STEERING USING A REFERENCE SIGNAL FEEDBACK

(75) Inventors: Jon G. Stanford, Garland, TX (US); Chris Karaguleff, Austin, TX (US)

(73) Assignee: Optical Switch Corporation, Richardson, TX (US)

( * ) Notice: Subject to any disclaimer, the term of this patent is extended or adjusted under 35 U.S.C. 154(b) by 0 days.

(21) Appl. No.: 09/483,742

(22) Filed: Jan. 17, 2000

(51) Int. Cl.$^7$ ............................. G02B 6/00; G02B 6/42
(52) U.S. Cl. ........................................ 385/18
(58) Field of Search ............................ 385/16, 18, 33, 385/22; 369/112.09, 44.14, 44.15, 44.17, 44.18, 44.19, 44.37, 103, 125; 359/833, 850, 851; 356/357, 359, 360, 349

(56) References Cited

U.S. PATENT DOCUMENTS

| | | | |
|---|---|---|---|
| 3,892,468 A | 7/1975 | Duguay | 350/96 B |
| 4,365,863 A | 12/1982 | Broussaud | 350/96.15 |
| 4,452,506 A | 6/1984 | Reeve et al. | 350/96.2 |
| 4,467,186 A | 8/1984 | Goralnick et al. | 250/201 |
| 4,498,730 A | 2/1985 | Tanaka et al. | 350/96.16 |
| 4,626,066 A | 12/1986 | Levinson | 350/96.18 |
| 4,696,062 A | 9/1987 | LaBudde | 455/612 |
| 4,762,391 A | 8/1988 | Margolin | 350/96.25 |
| 4,789,215 A | 12/1988 | Anderson et al. | 350/96.19 |
| 5,026,138 A | 6/1991 | Boudreau et al. | 350/96.2 |
| 5,062,150 A | 10/1991 | Swanson et al. | 359/152 |
| 5,133,030 A | 7/1992 | Lee | 385/19 |
| 5,159,656 A | 10/1992 | Goldstein | 385/116 |
| 5,221,987 A | 6/1993 | Laughlin | 359/222 |
| 5,343,546 A | 8/1994 | Cronin et al. | 385/52 |
| 5,400,428 A | 3/1995 | Grace | 385/115 |
| 5,444,801 A | 8/1995 | Laughlin | 385/16 |
| 5,553,175 A | 9/1996 | Laughlin | 385/16 |
| 5,555,327 A | 9/1996 | Laughlin | 385/16 |
| 5,555,558 A | 9/1996 | Laughlin | 385/16 |

(List continued on next page.)

FOREIGN PATENT DOCUMENTS

| | | | |
|---|---|---|---|
| EP | 0 299 604 | 1/1989 | G02B/25/02 |
| WO | WO 98/50813 | 11/1998 | G02B/26/02 |
| WO | WO 99/15925 | 4/1999 | G02B/6/35 |
| WO | WO 99/24858 | 5/1999 | G02B/26/02 |

OTHER PUBLICATIONS

International Search Report in International Application No. PCT/US 01/00167, dated Apr. 4, 2001, 7 pages.
Dale Murray, Michael Kadar–Kallen, and Warren Lewis, "Scalable Optical Switch Using Rotating Refractive Plates," *AMP Incorporated*, Date Unknown, 10 pages.
Astarte Fiber Networks, Inc. brochure, *Astarte Fiber Networks, Inc.*, Date Unknown, 4 pages.
"PZT Active Optics" section of catalog, *Physik Instruments (PI)*, Date Unknown, 6 pages.
SiTek® Electro Optics "Position Sensing Detectors," brochure, *On–Track® Photonics, Inc.*, Date Unknown, 6 pages.

*Primary Examiner*—Akm E. Ullahiner
(74) *Attorney, Agent, or Firm*—Baker Botts L.L.P.

(57) ABSTRACT

A system for processing an optical signal includes a reflector that reflects an input optical signal to a selected one of a number of output waveguides and reflects a reference optical signal associated with the input optical signal. A detector detects a position coordinate of the reference optical signal. A memory coupled to the detector stores an expected position coordinate for the reference optical signal. A controller coupled to the memory generates a control signal based upon the position coordinate detected by the detector and the expected position coordinate stored in the memory. An actuator coupled to the reflector positions the reflector in response to the control signal.

26 Claims, 5 Drawing Sheets

U.S. PATENT DOCUMENTS

| | | | |
|---|---|---|---|
| 5,566,260 A | 10/1996 | Laughlin | 385/16 |
| 5,590,227 A | 12/1996 | Osaka et al. | 385/53 |
| 5,621,829 A | 4/1997 | Ford | 385/22 |
| 5,647,033 A | 7/1997 | Laughlin | 385/16 |
| 5,664,034 A | 9/1997 | Mock | 385/16 |
| 5,727,099 A | 3/1998 | Harman | 385/52 |
| 5,748,812 A | 5/1998 | Buchin | 385/18 |
| 5,774,604 A | 6/1998 | McDonald | 385/18 |
| 5,841,916 A | 11/1998 | Laughlin | 385/16 |
| 5,875,271 A | 2/1999 | Laughlin | 385/16 |
| 5,892,863 A | 4/1999 | Presby | 385/16 |
| 5,909,301 A | 6/1999 | Laughlin | 359/222 |
| 5,917,641 A | 6/1999 | Laughlin | 359/222 |
| 5,974,019 A | 10/1999 | Belser et al. | 369/109 |
| 6,246,657 B1 | 6/2001 | Wilde et al. | 369/112.09 |

SYSTEM AND METHOD FOR BEAM-STEERING USING A REFERENCE SIGNAL FEEDBACK

TECHNICAL FIELD OF THE INVENTION

This invention relates to the field of optical communication systems and more particularly to a system for beam-steering using a reference signal feedback.

BACKGROUND OF THE INVENTION

Optical communication systems include optical components, such as optical fibers coupled to switching components, that receive, transmit, and otherwise process information in optical signals. The switching components in an optical communication system selectively direct the information carried by the optical signal to one or more other optical components. Existing optical communication systems are limited in a number of ways. One problem is that the scaleability of prior optical systems is limited by the difficulty associated with manufacturing the optical components of the system according to precise specifications having small tolerances for error. Another problem is that various adverse conditions existing during the switching operation may cause a deviation of the switching components resulting in a misalignment between the optical signal and the optical components. This results in a loss of a portion of the optical signal.

SUMMARY OF THE INVENTION

A system for beam-steering using a reference signal feedback is provided that substantially eliminates or reduces disadvantages and problems associated with previous optical systems.

In accordance with one embodiment of the present invention, a system for processing an optical signal includes a reflector that reflects an input optical signal to a selected one of a plurality of output waveguides and that reflects a reference optical signal associated with the input optical signal. A detector detects a position coordinate of the reference optical signal. A feedback module coupled to the detector generates a control signal based upon the detected position coordinate. An actuator coupled to the reflector positions the reflector in response to the control signal.

Another embodiment of the present invention is a method for processing an optical signal that includes reflecting an input optical signal to a selected one of a plurality of output waveguides using a reflector. The method continues by reflecting a reference optical signal using the reflector, wherein the reference optical signal is associated with the input optical signal. The method continues by detecting a position coordinate of the reference optical signal and by generating a control signal based upon the detected position coordinate. The method concludes by positioning the reflector in response to the control signal.

Technical advantages of the present invention include a system for processing an optical signal that performs a calibration operation and a switching operation. During the calibration operation, an input waveguide emits an input optical signal that is directed to a selected output waveguide by a reflector. An input device emits a reference signal that is directed to a position detector by the reflector. The reference signal maintains a predetermined angular correspondence to the input optical signal. An optical power meter measures the light intensity of the input optical signal received by the selected output waveguide. When the reflector is placed in an alignment position such that the input optical signal is substantially aligned with the output waveguide, the light intensity of the input optical signal measured by the optical power meter reaches a predetermined threshold. At this point, the position coordinate of the reference signal detected by the position detector is stored as an expected position coordinate by a memory of a feedback module.

During the switching operation, the input waveguide emits the input optical signal that is directed to the selected output waveguide by the reflector. The input device emits the reference signal that is directed to the position detector by the reflector. The reference signal maintains an angular correspondence with the input optical signal such that any deviation between the position coordinate of the reference signal detected by the position detector and the expected position coordinate of the reference signal measured during the calibration operation indicates a misalignment between the input optical signal and the output waveguide. A feedback controller generates a control signal based upon the difference between the expected position coordinate and the detected position coordinate of the reference signal. In this respect, the present invention determines a "correction factor" that is then used by an actuator to position the reflector in the appropriate alignment position.

The present invention uses active positional feedback of the reference signal in conjunction with calibrated alignment characteristics to switch the input optical signal from the input waveguide to the output waveguide and to correct any misalignments between the input optical signal and the output waveguide. In this respect, the present invention provides many technical advantages. For example, the present invention relaxes the design tolerances associated with precisely aligning the optical components of the system during manufacture. As a result, the present invention facilitates a scaleable optical switch. Furthermore, the present invention provides superior optical performance during the switching operation. For example, the reference signal supports determining any misalignments between the input signal and a selected output waveguide without extracting or diverting any portion of the input signal during the switching operation. Moreover, by using a reference signal feedback to place the reflector in the appropriate alignment position, the present invention facilitates switching an input optical signal from an input optical fiber to an output optical fiber with superior optical coupling and accuracy. The present invention therefore provides fiber-to-fiber optical switching that results in switching speeds of approximately one millisecond.

Other technical advantages are readily apparent to one skilled in the art from the following figures, descriptions, and claims.

BRIEF DESCRIPTION OF THE DRAWINGS

For a more complete understanding of the present invention and its advantages, reference is now made to the following description taken in conjunction with the accompanying figures in which like reference numbers indicate like features and wherein:

FIG. 3 illustrates a view of a reflector of the system taken along line 3B—3B of FIG. 1;

DETAILED DESCRIPTION OF THE INVENTION

Figure 1:
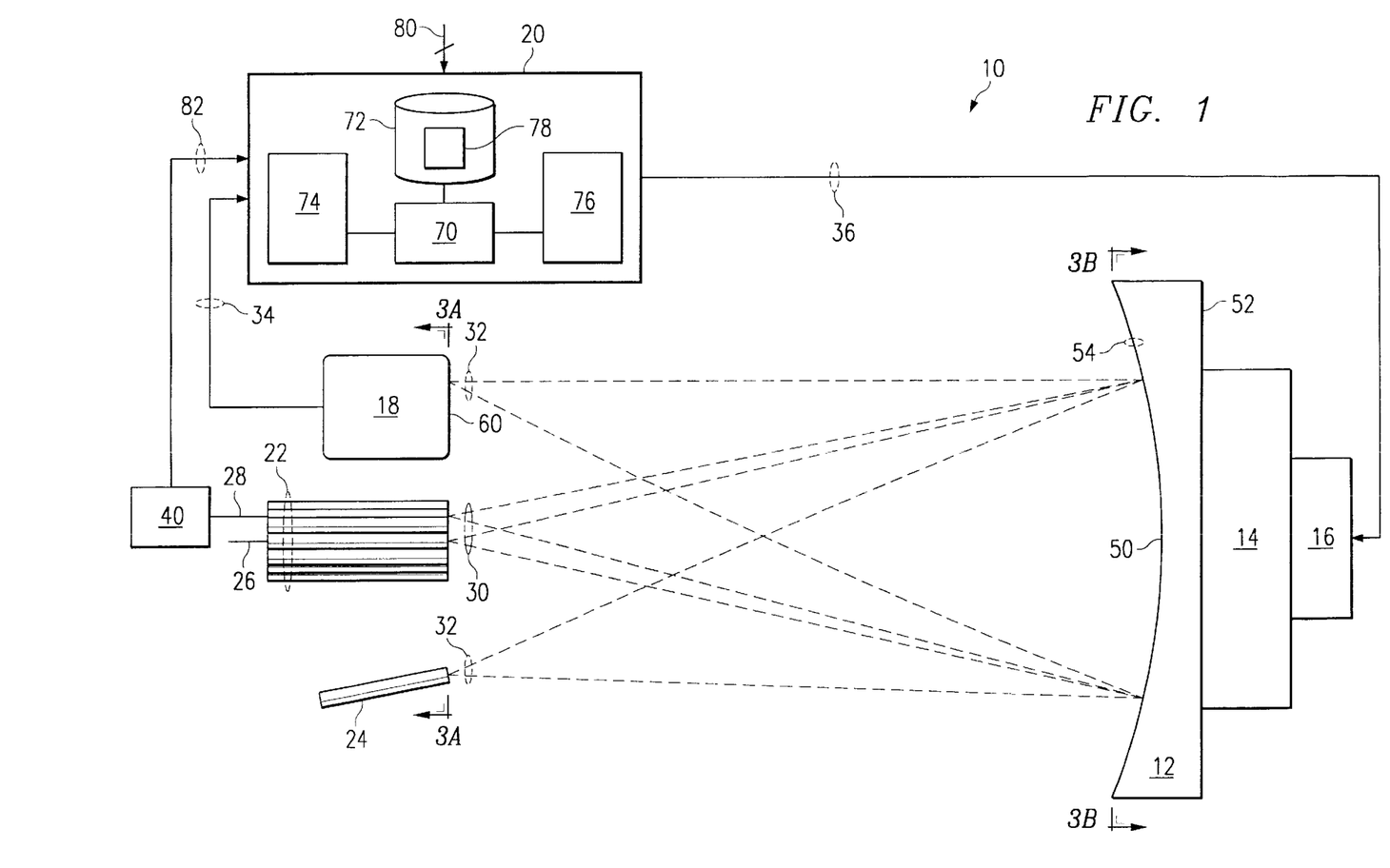
FIG. 1 illustrates one embodiment of a system for beam-steering in accordance with the present invention.

FIG. 1 illustrates one embodiment of an optical system 10 that includes a reflector 12 coupled to a tilt mechanism 14 and an actuator 16. A position detector 18 couples to actuator 16 using a feedback module 20. System 10 further comprises optical waveguides 22 and an input device 24. Actuator 16, position detector 18, and feedback module 20 may be collectively referred to as a feedback circuit. During a calibration operation, system 10 further comprises an optical power meter 40 coupled to optical waveguides 22 and feedback module 20.

In general, one of optical waveguides 22, generally referred to as an input optical waveguide 26, emits an input optical signal 30 that is directed to a selected other one of optical waveguides 22, generally referred to as an output optical waveguide 28, by reflector 12. Input device 24 emits a reference optical signal 32 that is directed to position detector 18 by reflector 12. Reference optical signal 32 is associated with input optical signal 30 such that the alignment of signal 30 with the selected waveguide 28 corresponds to an expected position coordinate of signal 32 on position detector 18. Therefore, any deviation between the expected position coordinate of signal 32 and the detected position coordinate of signal 32 represents a misalignment between optical signal 30 and the selected waveguide 28. Feedback module 20 generates a control signal 36 based upon the expected position coordinate of signal 32 and the detected position coordinate of signal 32. Optical system 10 corrects any misalignments between optical signal 30 and the selected waveguide 28 by actuating tilt mechanism 14 to position reflector 12 in response to control signal 36.

Reflector 12 comprises any suitable material that directs signal 30 to waveguides 28 and directs signal 32 to position detector 18. In one embodiment, reflector 12 comprises a concave reflective surface 50 and a base 52 coupled to tilt mechanism 14. In this embodiment, concave reflective surface 50 reflects a diverging optical signal 30 such that it converges toward a selected waveguide 28. Reflective surface 50 may include a reflective coating 54 that increases the reflectivity of surface 52. Reflector 12 may also be embodied in a flat reflective surface 50, such as a flat mirror, described in greater detail below with reference to FIG. 2.

Tilt mechanism 14 comprises any suitable support structure, such as a tilt stage, that displaces reflector 12 with respect to two axes. For example, tilt mechanism 14 may displace reflector 12 along an x-axis of surface 50 and/or along a y-axis of surface 50. Actuator 16 comprises a piezoelectric device, a bimorph transducer, or any other suitable material that displaces tilt mechanism 14, and therefore reflector 12, along the x-axis and/or the y-axis of surface 50 in response to an electrical, thermal, or otherwise appropriate control signal 36.

Position detector 18 comprises any suitable combination of optical, electrical, mechanical, or thermal components having a detector surface 60 to detect a position coordinate of reference signal 32 directed by reflector 12. Position detector 18 generates a position signal 34 based upon the position coordinate of signal 32 detected on surface 60. In one embodiment, position detector 18 comprises a silicon photodiode that processes photocurrents generated by the detection of reference signal 32 to determine the position of signal 32 measured along a first axis of surface 60 and along a second axis of surface 60. The silicon photodiode generates a position signal 34 proportional to the position coordinate of signal 32 detected on surface 60.

In one embodiment, position signal 34 comprises a first voltage and a second voltage. The first voltage comprises an analog voltage signal that is proportional to the angular displacement of reflector 12 along the first axis of surface 50, such as the x-axis. The second voltage comprises an analog voltage signal that is proportional to the angular displacement of reflector 12 along the second axis of surface 50, such as the y-axis. The detected position coordinate of reference signal 32 is also based upon the angular displacement of reflector 12 along the x-axis and the y-axis. Therefore, the first and second voltages of position signal 34 represent the position coordinate of reference signal 32 detected by position detector 18.

In another embodiment, position signal 34 comprises a digital signal representing the position coordinate of reference signal 32 detected by position detector 18. The digital signal includes first position information and second position information. The first position information comprises information representing the position of reference signal 32 measured along the x-axis. The second position information comprises information representing the position of reference signal 32 measured along the y-axis.

Feedback module 20 comprises a feedback controller 70 coupled to a memory 72 and to interfaces 74 and 76. In general, feedback module 20 receives position signal 34, command signal 80, and measurement signal 82, and generates a control signal 36. Command signal 80 comprises information identifying an output waveguide 28 selected during a switching operation of system 10. Measurement signal 82 comprises information used to determine whether reflector 12 is in an alignment position during the calibration operation. Feedback module 20 generally stores the currently detected position coordinate of reference signal 32 as an expected position coordinate in response to an appropriate measurement signal 82, as described in greater detail below.

In one embodiment, controller 70 comprises any number and combination of transistors, logic devices, or any other suitable electrical components that generate a control signal 36 based upon the expected position coordinate of signal 32 and the detected position coordinate of signal 32. Although controller 70 is described in terms of a hardware implementation of system 10, it should be understood that the features of controller 70 may also be implemented in software executed by any general purpose data processing facility, such as a central processing unit of a personal computer or workstation.

Memory 72 comprises any suitable combination of digital or analog memory elements, such as volatile or non-volatile memory devices, that store position information 78 representing the expected position coordinates determined for reference signal 32 during the calibration operation described below. Each expected position coordinate of position information 78 is associated with a corresponding output waveguide 28. Position information 78 is described in greater detail with reference to FIG. 4. Interfaces 74 and 76 comprise any suitable combination of amplifiers, analogto-digital converters, digital-to-analog converters, or any other suitable electrical components that support processing signals 34, 36, 80 and/or 82.

Optical waveguides 22 comprise any number and arrangement of prisms, rhomboids, or any other suitable optically transmissive material that communicates optical signal 30 as a guided wave of energy. Optical waveguides 22 include an input optical waveguide 26 and a number of output optical waveguides 28. In one embodiment of system 10, waveguides 22 comprise optical fibers (referred to generally as optical fibers 22, input optical fiber 26, and output optical fibers 28) that include a core designed to transmit or receive information in the form of light pulses, and a cladding that surrounds the core to prevent signal 30 from escaping the core during transmission.

Each core of optical fibers 22 comprises any suitable refractive material, such as glass, having a particular index of refraction. Each cladding of optical fibers 22 comprises any suitable refractive material, such as glass, having an index of refraction lower than that of the corresponding core such that signal 30 propagates along the longitudinal axis of a particular fiber 22. Optical fibers 22 may comprise a multimode fiber having a large core (e.g., 52 microns wide) or a single mode fiber having a small core (e.g., 9 microns wide).

Although the following description is detailed with reference to fibers 22 having a circular cross-section, it should be understood that the cross-section of optical fibers 22 may have any suitable shape, including, but not limited to, an oval or a circle having grooves or notches. In one embodiment of system 10, fibers 22 are fused together in a fiber bundle to provide a mechanically stable arrangement of fibers 22. A dense packing of fibers 22 formed by this fused fiber bundle improves both the scaleability and speed of the switching operation of system 10 by limiting the angular displacement range of reflector 12. The bundle of fibers 22 is described in greater detail with respect to FIG. 3A.

Input device 24 comprises a laser, a light emitting diode (LED), or any other suitable source of reference signal 32. Optical signals 30 and 32 comprise visible light, infrared radiation, ultraviolet radiation, or any other suitable optical beam. Input device 24 generates reference optical signal 32 having a predetermined angular correspondence to input optical signal 30 such that the detected position coordinate of reference optical signal 32 at detector 18 can be used to determine the alignment of input optical signal 30 with optical fibers 28. For example, the angular steering of signal 32 by reflector 12 is closely related to the angular steering of signal 30 by reflector 12. In this respect, any deviation of signal 30 with respect to a particular output optical fiber 28 results in a corresponding deviation of the detected position coordinate of the signal 32 with respect to the expected position coordinate of signal 32.

Optical system 10 performs two primary operations. First, system 10 calibrates the alignment of optical signal 30 with each of output optical fibers 28. System 10 includes an optical power meter 40 during this calibration operation. Second, system 10 switches optical signal 30 from an input optical fiber 26 to a selected output optical fiber 28 and corrects any misalignments between signal 30 and the selected fiber 28 using reference signal 32.

In operation of system 10 during calibration, input optical fiber 26 emits an optical signal 30 that is directed to a particular output optical fiber 28 by reflector 12. An optical power meter 40 coupled to the particular fiber 28 comprises any appropriate combination of electrical and optical components that measure the light intensity of signal 30 received by fiber 28. Input device 24 emits reference optical signal 32 such that signal 32 maintains a predetermined angular correspondence with signal 30. Reflector 12 directs signal 32 to position detector 18. Position detector 18 determines the position coordinate of signal 32 along the x-axis and along the y-axis of detector surface 60. Position detector 18 generates a position signal 34 based upon the detected position coordinate of signal 32. Because the position coordinate of signal 32 is based upon the angular displacement of reflector 12, position signal 34 is based upon the angular displacement of reflector 12 when signal 30 is aligned with the particular fiber 28. In one embodiment, position signal 34 includes a first voltage and a second voltage. The first voltage comprises an analog voltage signal that is proportional to the angular displacement of reflector 12 along the x-axis. The second voltage comprises an analog voltage signal that is proportional to the angular displacement of reflector 12 along the y-axis.

Optical power meter 40 detects the light intensity of signal 30 received by the particular fiber 28. Power meter 40 communicates to feedback module 40 a measurement signal 82 that indicates the light intensity of signal 30 measured by power meter 40. Actuator 16 and tilt mechanism 14 displace reflector 12 along the x-axis and/or the y-axis of surface 50 until reflector 12 is placed in an alignment position such that the light intensity of signal 30 as indicated by measurement signal 82 reaches a predetermined threshold. The predetermined threshold may be determined such that the light intensity of signal 30 reaches the predetermined threshold when signal 30 is substantially aligned with the particular output optical fiber 28.

When the reflector 12 is placed in the alignment position as indicated by the light intensity of signal 30 reaching the predetermined threshold, memory 72 of feedback module 20 stores as position information 78 the information communicated in position signal 34. For example, memory 72 stores as position information 78 the first and second voltages of position signal 34 indexed according to the particular fiber 28 currently being calibrated. The first and second voltages of position signal 34 therefore represent the expected position coordinate of signal 32 when signal 30 is aligned with the particular fiber 28. The first and second voltages of position signal 34 stored in memory 72 are referred individually as "first expected voltage" and "second expected voltage," respectively, and are referred to collectively as "expected voltages." Position information 78 therefore represents an expected position coordinate for reference signal 32 that corresponds to the expected alignment of signal 30 with the selected fiber 28. Therefore, any deviation between the expected position coordinate of signal 32 calculated during the calibration operation and a detected position coordinate of signal 32 determined during the switching operation represents a misalignment between signal 30 and the selected fiber 28.

In one embodiment, system 10 calibrates the alignment of optical signal 30 with optical fiber 28 over a range of conditions that may affect the switching operation of system 10. For example, position detector 18 may generate a range of expected voltages representative of the expected position coordinate of reference signal 32 measured over a suitable range of temperatures. Memory 72 stores as position information 78 the range of expected voltages corresponding to the range of temperatures. In this embodiment, feedback module 20 may include a temperature sensor or any other appropriate device to allow controller 10 to generate control signal 36 based upon the appropriate expected voltages. In this respect, system 10 may correct a misalignment between signal 30 and fiber 28 caused by a temperature variation affecting system 10 during the switching operation.

The calibration operation is repeated with the power meter 40 coupled to each of the remaining fibers 28. Upon completing the calibration operation, memory 72 stores position information 78 for each fiber 28 of system 10.

In operation of system 10 during switching, input optical fiber 26 emits a signal 30 that is directed to a selected one of the output optical fibers 28 by reflector 12. Input device 24 emits a reference signal 32 that is directed to position detector 18 by reflector 12. System 10 generally corrects any misalignments between signal 30 and the selected fiber 28 based upon the difference between an expected position coordinate of signal 32 determined during the calibration operation and a position coordinate of signal 32 detected during the switching operation. Feedback module 20 determines the appropriate expected position coordinate of signal 32 from position information 78. For example, feedback module 20 receives a command signal 80 that identifies the selected fiber 28. Controller 70 accesses the appropriate position information 78 based upon command signal 80. In one embodiment, the position information 78 associated with the selected fiber 28 identified by signal 80 comprises expected voltages determined during the calibration operation. The expected voltages represent the expected position coordinate of signal 32 when signal 30 is aligned with the selected fiber 28.

Position detector 18 detects reference signal 32 and, in response, generates position signal 34 based upon the position coordinate of signal 32 detected on detector surface 60. In one embodiment, position signal 34 includes a first voltage and a second voltage. The first voltage comprises an analog voltage signal that is proportional to the angular displacement of reflector 12 along the x-axis during the switching operation. The second voltage comprises an analog voltage signal that is proportional to the angular displacement of reflector 12 along the y-axis during the switching operation. The detected position coordinate of reference signal 32 is based upon the angular displacement of reflector 12 along the x-axis and the y-axis. Therefore, the first and second voltages of position signal 34 represent the position coordinate of signal 32 detected during the switching operation. The first and second voltages of signal 34 generated during the switching operation are individually referred to as a "first detection voltage" and a "second detection voltage," respectively, and are collectively referred to as "detection voltages." Position detector 18 communicates the detection voltages of position signal 34 to feedback module 20.

Feedback module 20 receives the detection voltages of position signal 34 at interface 74. Interface 74 amplifies, converts, or otherwise processes the detection voltages for communication to controller 70. Controller 70 generates control signal 36 based upon the appropriate detection voltages representing the detected position coordinate of reference signal 32 and the appropriate expected voltages representing the expected position coordinate of reference signal 32. In one embodiment, control signal 36 comprises a first control voltage used to actuate tilt mechanism 14 along the x-axis of surface 50, and a second control voltage used to actuate tilt mechanism 14 along the y-axis of surface 50. In this embodiment, control signal 36 may be modeled by the following control signal equations:

$$V_x = K(V_{x\text{-}expected} - V_{x\text{-}detected})$$

where: $V_x$=control voltage for actuator 16 along the x-axis of surface 50;

$V_{x\text{-}expected}$=first expected voltage;

$V_{x\text{-}detected}$=first detection voltage; and

K=amplification constant.

$$V_y = K(V_{y\text{-}expected} - V_{y\text{-}detected})$$

where: $V_y$=control voltage for actuator 16 along the y-axis of surface 50;

$V_{y\text{-}expected}$=second expected voltage;

$V_{y\text{-}detected}$=second detection voltage; and

K=amplification constant.

The amplification constant, K, increases to a desired degree the sensitivity of control signal 36 to the difference between the expected voltages and the detection voltages.

Actuator 16 operates tilt mechanism 14 in response to control signal 36 to adjust the position of reflector 12 along the x-axis and/or the y-axis of surface 50. For example, actuator 16 may operate tilt mechanism 14 in response to $V_x$ to displace reflector 12 along the x-axis. Furthermore, actuator 16 may operate tilt mechanism 14 in response to $V_y$ to displace reflector 12 along the y-axis. As reflector 12 approaches the alignment position such that signal 30 is substantially aligned with output optical fiber 28, the detected position coordinate of reference signal 32 approaches the expected position coordinate of reference signal 32. Accordingly, the detection voltages associated with reference signal 32 converge toward the expected voltages associated with reference signal 32. In this respect, the difference between the expected and detected voltages becomes smaller and control voltages $V_x$ and $V_y$ stabilize. Actuator 16, operating tilt mechanism 14 in response to the control voltages $V_x$ and $V_y$, positions reflector 12 such that signal 30 is substantially aligned with the selected output optical fiber 28.

During the switching operation of system 10, various adverse conditions (e.g., imperfections in reflector 12, temperature variations or other environmental changes in system 10, improper actuation of tilt mechanism 14, etc.) may cause a deviation of the components in system 10 which results in a misalignment of signal 30 with the selected output optical fiber 28. Because reference signal 32 is closely related to input signal 30, however, any such adverse conditions will result in a corresponding deviation between the expected position coordinate of signal 32 and the detected position coordinate of signal 32. Accordingly, any such adverse conditions will also result in a corresponding deviation between the detection voltages and the expected voltages used to generate control signal 36.

Feedback module 20 generates control signal 36 according to the control signal equations described above, taking into account the differences between the appropriate expected and detection voltages caused by the misalignment between signal 30 and fiber 28. In response to control signal 36, actuator 16 repositions reflector 12 using tilt mechanism 14 such that signal 30 is again properly aligned with the selected output optical fiber 28. In this respect, optical system 10 corrects any misalignments between signal 30 and the selected fiber 28 by actuating tilt mechanism 14 to position reflector 12 in response to control signal 36.

By using active positional feedback of reference signal 32 in conjunction with calibrated alignment characteristics to switch optical signal 30 between optical fibers 22, system 10 provides many technical advantages.

For example, system 10 relaxes the design tolerances associated with precisely aligning the optical components of system 10 during manufacture. In particular, it relaxes the alignment accuracy needed for positioning fibers 22 during manufacture. As a result, the present invention facilitates a scaleable optical switch. Furthermore, the present invention provides superior optical performance during the switching operation. For example, the reference signal 32 supports determining any misalignments between the input signal 30 and a selected output waveguide 28 without extracting or diverting any portion of the input signal 30 during the switching operation. Moreover, by using a reference signal feedback to place the reflector 12 in the appropriate alignment position, the present invention facilitates switching an input optical signal 30 from an input optical fiber 26 to an output optical fiber 28 with superior optical coupling and accuracy. The present invention therefore provides fiber-to-fiber optical switching that results in switching speeds of approximately one millisecond.

Figure 2:
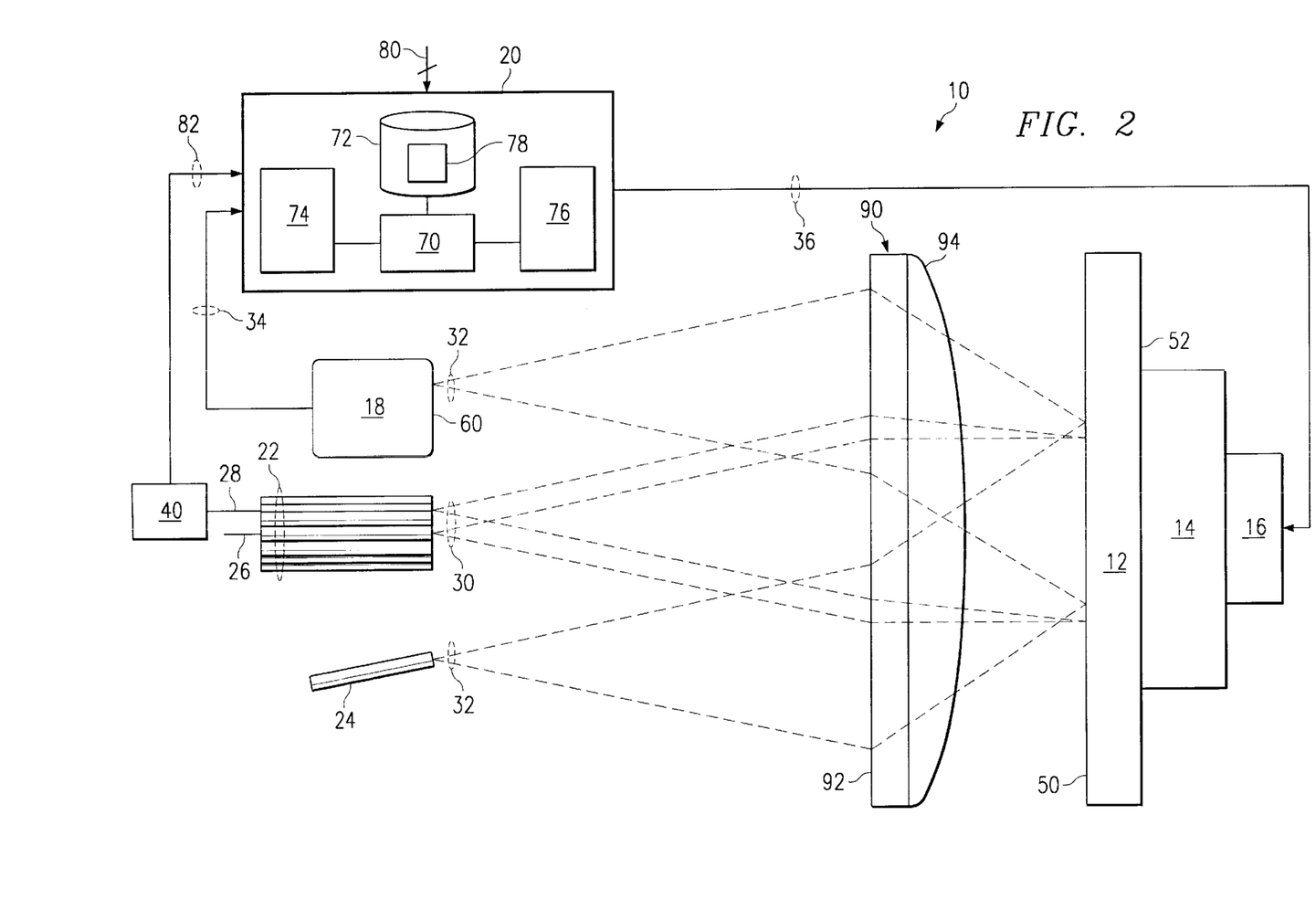
FIG. 2 illustrates another embodiment of a system for beam-steering in accordance with the present invention.

FIG. 2 illustrates another embodiment of optical system 10 that includes reflector 12 having a flat reflective surface 50 and a base 52 coupled to tilt mechanism 14. System 10 further includes a refractive material 90 positioned between reflector 12 and fibers 22. Refractive material 90 comprises a rhomboid, a prism, or any other suitable configuration of optically transmissive material, such as glass. Material 90 includes a first surface 92, and a second surface 94. In one embodiment, material 90 is formed as a doublet lens having a flat first surface 92 and a convex second surface 94.

Material 90 receives optical signal 30 from fibers 22 and collimates signal 30 for communication to reflector 12. Reflector 12, positioned by tilt mechanism 14 using actuator 16 in response to control signal 36, directs collimated optical signal 30 toward a selected output optical fiber 28. Material 90 receives the collimated signal reflected by reflector 12 and focuses signal 30 toward the selected fiber 28. Similarly, material 90 receives and collimates reference signal 32 for communication to reflector 12. Reflector 12 directs collimated reference signal 32 toward position detector 18. Material 90 focuses reference signal 32 toward detector surface 60 of position detector 18.

The remaining operation of system 10 illustrated in FIG. 2 is substantially similar to the operation of system 10 described above with regard to FIG. 1. For example, system 10 illustrated in FIG. 2 performs the calibration operation described above with respect to FIG. 1. Furthermore, system 10 illustrated in FIG. 2 switches optical signal 30 from an input optical fiber 26 to a selected output optical fiber 28, and corrects any misalignments between signal 30 and the selected output optical fiber 28 using reference signal 32, as described above with reference to FIG. 1.

Figure 3A:
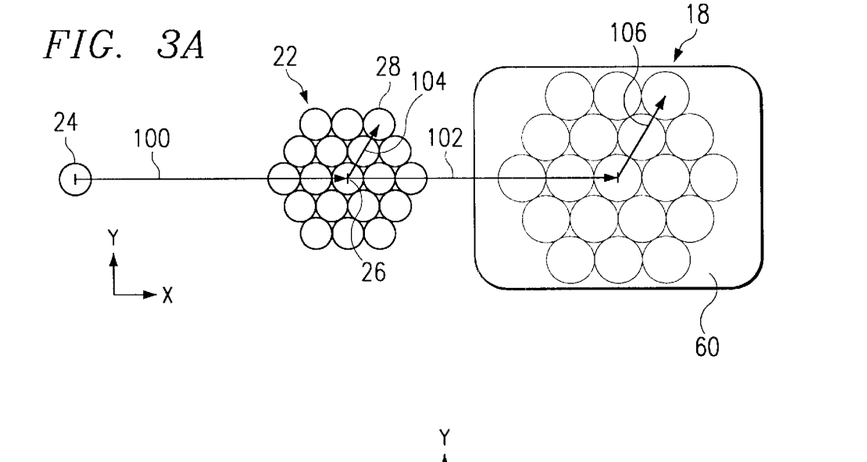
FIG. 3A illustrates a view of a portion of the system taken along line 3A—3A of FIG. 1.

FIG. 3A illustrates a view of position detector 18, optical fibers 22, and input device 24 taken along line 3A—3A of FIG. 1. In particular, FIG. 3A illustrates optical fibers 22 configured as a fused bundle. Fusing optical fibers 22 provides a spatially dense grouping that is mechanically stable with respect to each other. In a particular embodiment of system 10, fibers 22 comprise single mode fibers which have been stripped on one end to the cladding diameter such that the jacket and buffer layers are removed. The fibers 22 are then fused in a rigid array with a nominal core-to-core distance of the cladding diameter or less. In one embodiment, input optical fiber 26 is arranged in the center of the bundle of fibers 22 such that the optical axis of fiber 26 is coincident with the optical axis of reflector 12. Furthermore, the optical axis of fiber 26 is generally arranged equidistant from and in the same plane as the center of input device 24 and the center of surface 60 of position detector 18. In this respect, vector 100 is equal to vector 102. Fiber 26 emits optical signal 30 for communication to another fiber 22, such as an output optical fiber 28.

FIG. 3A further illustrates detector surface 60 of position detector 18. An image of the bundle of fibers 22 is shown superimposed on surface 60 of detector 18 as a conceptual aid to understand the unique features and functions of system 10. It should be understood, however, that only reference signal 32 emitted by input device 24 is imaged on surface 60 of position detector 18. Position detector 18, fibers 22, and input device 24 are illustrated in FIG. 3A with reference to the x-axis and the y-axis.

Both reference signal 32 emitted by input device 24 and input optical signal 30 emitted by fiber 26 are directed by the same reflector 12 resulting in corresponding trajectories of signals 30 and 32 on fibers 22 and detector 18, respectively. If reflector 12 is displaced along the x-axis and/or the y-axis such that optical signal 30 is directed to output optical fiber 28, as indicated by vector 104, then reference signal 32 will be detected on detector surface 60 at the location of the tail of vector 106. In a particular embodiment, the length of vector 106 on detector surface 60 is multiplied by a magnification constant associated with a lens or some other suitable pre-processing device (not explicitly shown) positioned between position detector 18 and reflector 12. This magnification is intended to improve the resolution of position detector 18 since the diameter of a bundle of single mode optical fibers 22 is a one-half millimeter and the diameter of detector 18 is approximately two millimeters.

Figure 3B:
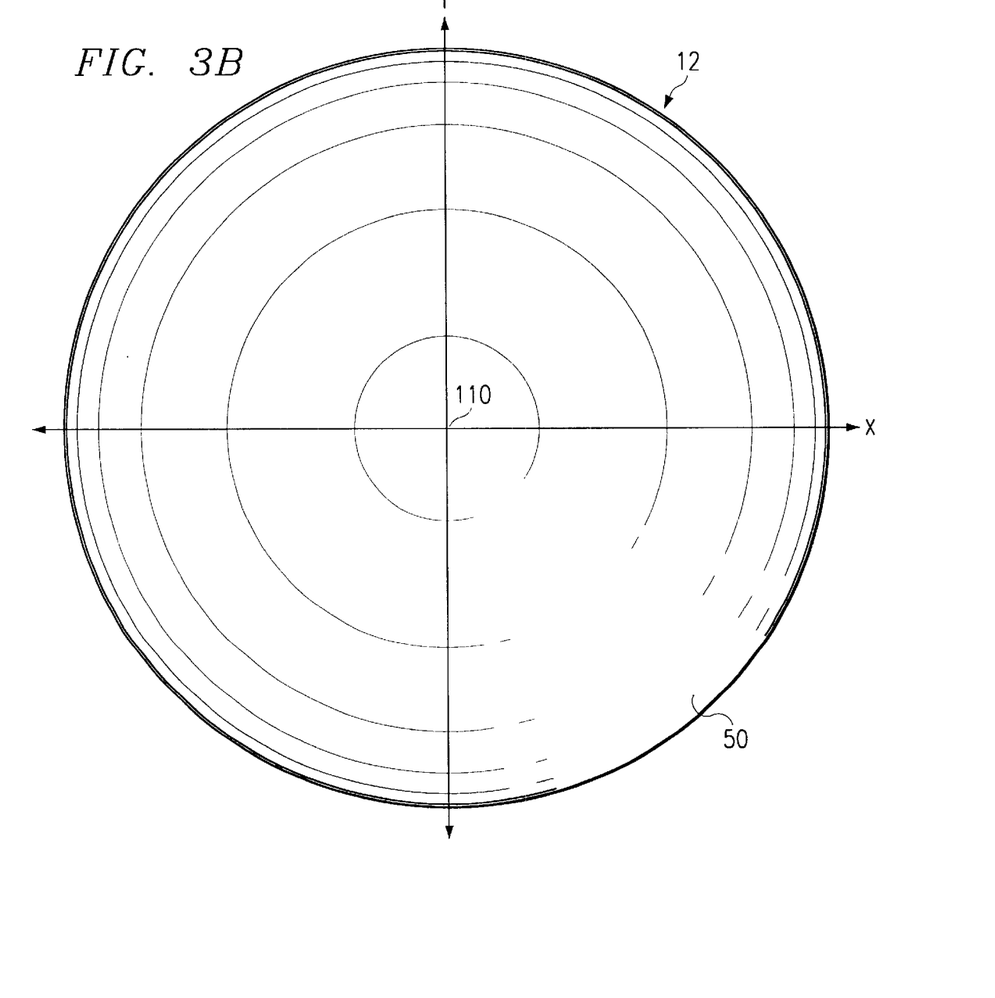

FIG. 3B illustrates a view of reflector 12 taken along line 3B—3B of FIG. 1. Reflector 12 is illustrated with reference to the x-axis and the y-axis. In one embodiment, reflector 12 is positioned such that the optical axis of surface 50, indicated at point 110, is substantially coincident with the optical axis of the center fiber 22 in the bundle of fibers 22 illustrated in FIG. 3A.

Actuator 16 may adjust tilt mechanism 14 in response to a control signal 36 such that reflector 12 is displaced along the x-axis and/or the y-axis. Displacing reflector 12 along the x-axis and/or the y-axis causes a change in direction of signals 30 and 32, as described above with reference to FIG. 3A. Control signal 36 generally comprises a first control voltage used to adjust reflector 12 along the x-axis, and a second control voltage used to adjust reflector 12 along the y-axis. Therefore, the position of reflector 12 may be independently adjusted along the x-axis, the y-axis, or both.

Figure 4:
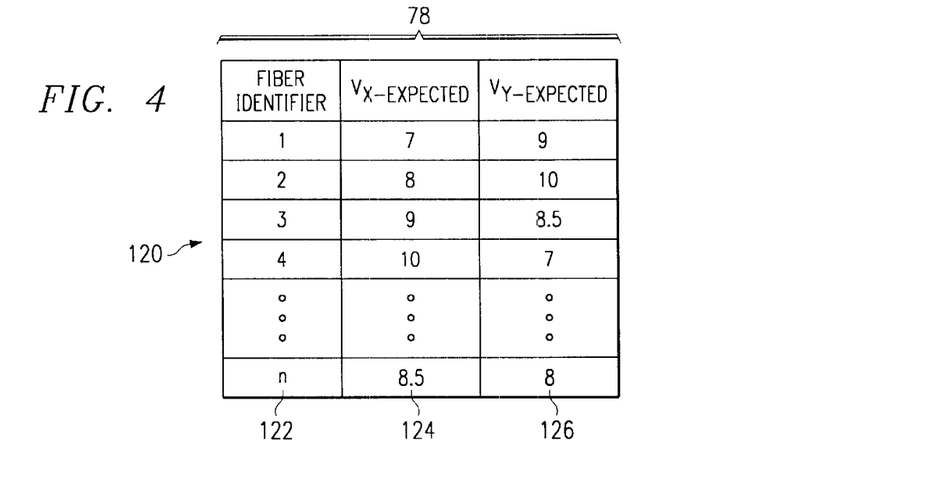
FIG. 4 illustrates one embodiment of position information us by a feedback module of the system.

FIG. 4 illustrates position information 78 arranged in one embodiment of a position information table 120 stored in memory 72 of feedback module 20. Each entry of position information table 120 includes position information 78 indexed according to a fiber identifier 122. In one embodiment, position information 78 comprises a first expected voltage 124 and a second expected voltage 126. Together, expected voltages 124 and 126 comprise analog voltage signals that represent the expected coordinate of reference signal 32 determined during the calibration operation of system 10 for a fiber 28 indicated by fiber identifier 122.

In general, controller 70 accesses the appropriate position information 78 stored in position information table 120 in order to determine control signal 36. Controller 70 generates control signal 36 according to the control signal equations described above. Although position information table 120 illustrates position information 78 indexed only according to fiber identifier 122, it should be understood that position information 78 may be determined and stored according to a host of factors that may affect the switching operation of system 10 such as, for example, operating temperature, detector noise, or any other appropriate factor that may affect the switching operation of system 10.

Figure 5:
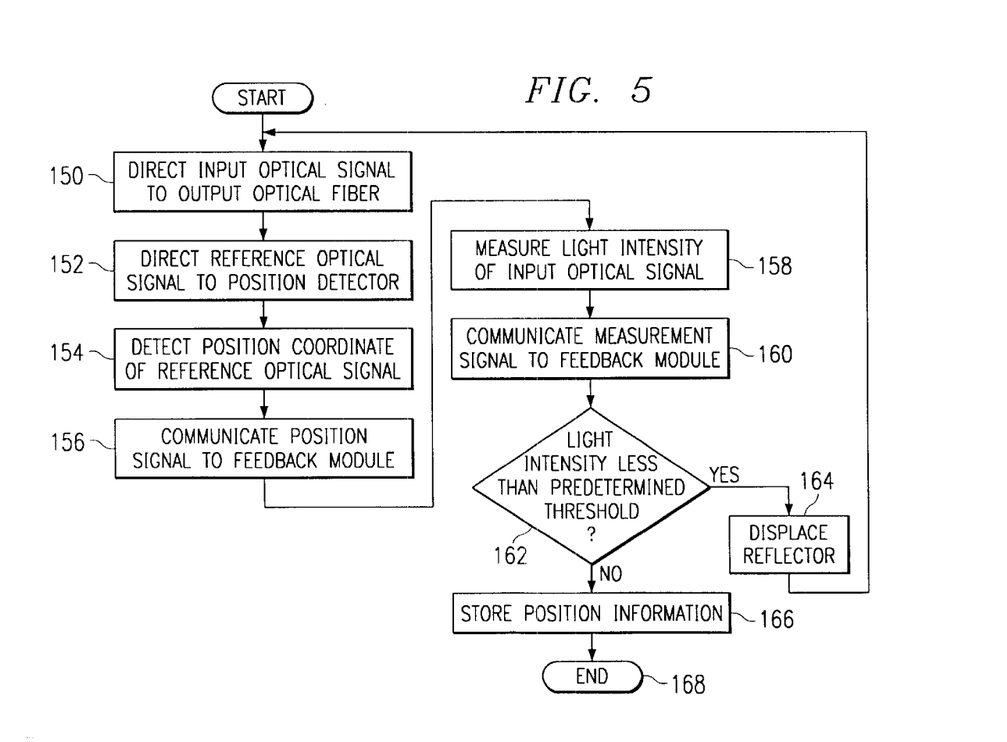
FIG. 5 illustrates an exemplary method for calibrating the alignment of an output optical fiber of the system according to the present invention.

FIG. 5 illustrates a flowchart of an exemplary method for calibrating the alignment of a selected output optical fiber 28. The method begins at step 150 where an input optical fiber 26 emits an optical signal 30 that is directed to the selected output optical fiber 28 by reflector 12. Input device 24 emits reference signal 32 that is directed to position detector 18 by reflector 12 at step 152. Reference signal 32 generally maintains a predetermined angular correspondence to optical signal 30. Position detector 18 detects the position coordinate of reference signal 32 at step 154. At step 156, position detector 18 communicates to feedback module 20 a position signal 34 representing the detected position coordinate of reference signal 32. An optical power meter 40 coupled to the selected output optical fiber 28 measures the light intensity of optical signal 30 at step 158. At step 160, power meter 40 communicates to feedback module 20 a measurement signal 82 indicating the light intensity of optical signal 30 measured by power meter 40.

Feedback controller 70 determines whether the light intensity of optical signal 30 as indicated by measurement signal 82 is less than a predetermined threshold at step 162. If so, execution proceeds to step 164 where actuator 16 displaces reflector 12 using tilt mechanism 14. Execution then returns to step 150. If the light intensity of optical signal 30 is not less than the predetermined threshold as determined at step 162, execution proceeds to step 166 where memory 72 of feedback module 20 stores position information 78. Position information 78 is indexed according to the selected output optical fiber 28 and represents the expected position coordinate of reference signal 32 when optical signal 30 is aligned with the selected fiber 28. Execution terminates at step 168. System 10 repeats the calibration operation described with reference to steps 150 through 168 for each output optical fiber 28 in system 10. In this respect, system 10 generates position information 78 associated with each of the output optical fibers 28.

Figure 6:
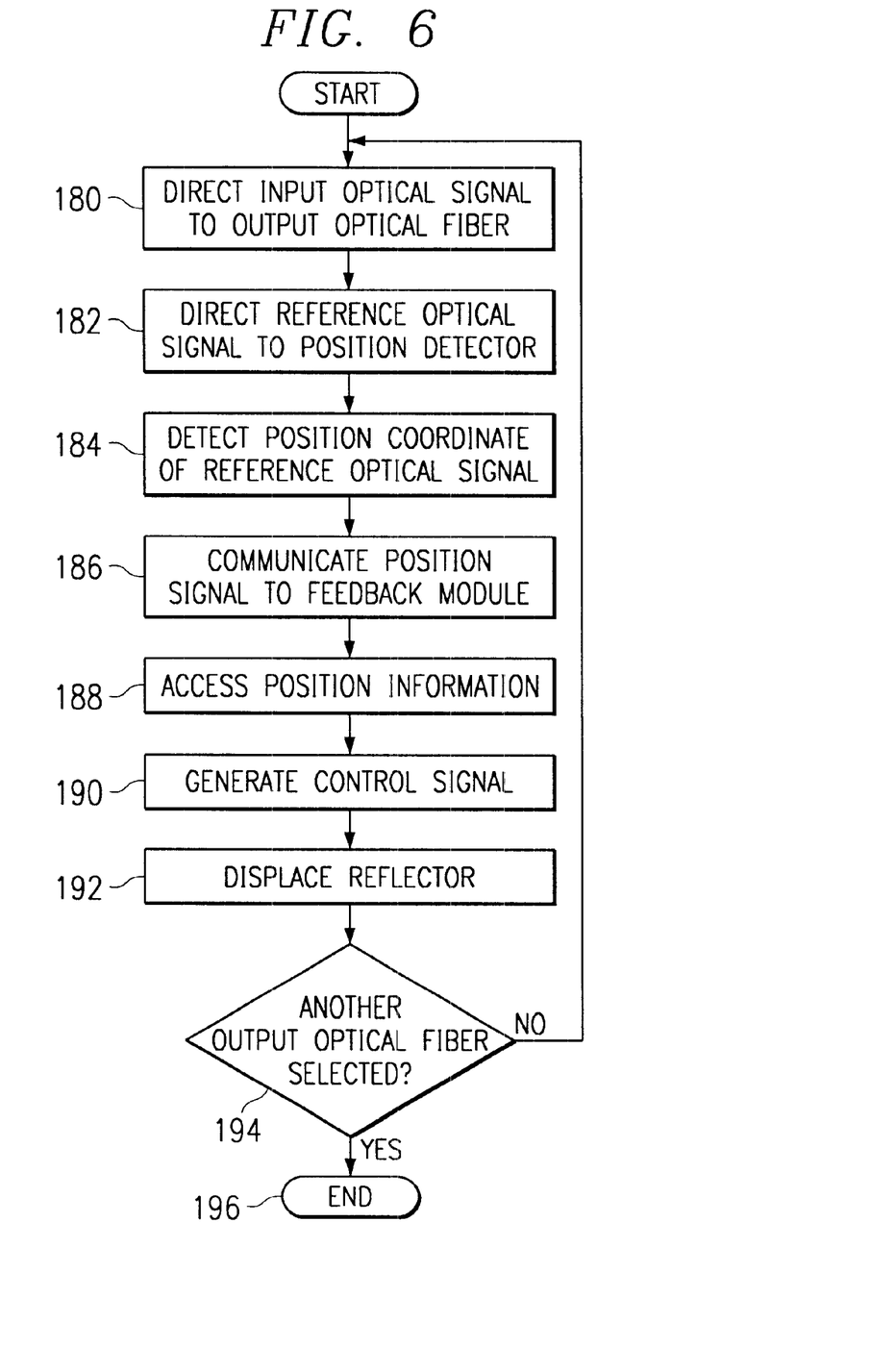
FIG. 6 illustrates an exemplary method for aligning an optical signal with an output optical fiber of the system according to the present invention.

FIG. 6 illustrates a flowchart of an exemplary method for aligning optical signal 30 with a selected output optical fiber 28. The method begins at step 180 where input optical fiber 26 emits an optical signal 30 that is directed to a selected output optical fiber 28 by reflector 12. Input device 24 emits a reference signal 32 that is directed to position detector 18 by reflector 12, at step 182. Reference signal 32 maintains a predetermined angular correspondence with optical signal 30. Position detector 18 detects the position coordinate of reference signal 32 at step 184. Position detector 18 communicates position signal 34 to feedback module 20 at step 186. In one embodiment, position signal 34 comprises detection voltages that represent the detected position coordinate of reference signal 32.

Feedback controller 70 accesses position information 78 stored in memory 72 at step 188, according to the selected output optical fiber 28. In one embodiment, position information 78 comprises expected voltages representing the expected position coordinate of reference signal 32. Feedback controller 70 generates control signal 36 based upon the detected position coordinate of reference signal 32 and the expected position coordinate of reference signal 32, at step 190. In one embodiment, feedback controller 70 generates control signal 36 using the detection voltages communicated by position detector 18 and the expected voltages retrieved from memory 72.

Actuator 16 displaces reflector 12 using tilt mechanism 14 in response to control signal 36, at step 192. Feedback module 20 determines whether another output optical fiber 28 is selected at step 194. If not, execution returns to step 180. If so, execution terminates at step 196. System 10 repeats the alignment operation described with reference to steps 180 through 196 for each selected fiber 28 to which optical signal 30 is switched.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A system for processing an optical signal, comprising:
 a reflector having a concave reflective surface operable to reflect an input optical signal to a selected one of a plurality of output waveguides and further operable to reflect a reference optical signal associated with the input optical signal;
 a detector operable to detect a position coordinate of the reference optical signal;
 a feedback module coupled to the detector and operable to generate a control signal based upon the detected position coordinate; and
 an actuator coupled to the reflector and operable to position the reflector in response to the control signal.

2. The system of claim 1, wherein:
 the input optical signal comprises a diverging optical beam; and
 the concave reflective surface is operable to reflect the input optical signal such that the input optical signal converges toward the selected output waveguide.

3. The system of claim 2, wherein the concave reflective surface further comprises a reflective coating operable to reflect the input optical signal.

4. The system of claim 1, further comprising a refractive material operable to collimate the input optical signal for reflection by the reflector and further operable to decollimate the input optical signal reflected by the reflector such that the input optical signal focuses toward the selected output waveguide.

5. The system of claim 1, wherein the output waveguides comprise optical fibers.

6. The system of claim 1, wherein the reference optical signal comprises an optical beam having a predetermined angular correspondence to the input optical signal.

7. The system of claim 1, wherein the position coordinate of the reference optical signal is measured along a first axis and a second axis.

8. The system of claim 1, wherein the feedback module comprises:
 a memory operable to store a plurality of expected position coordinates for the reference optical signal, each expected position coordinate associated with a particular output waveguide; and
 a controller coupled to the memory and operable to generate the control signal based upon the expected position coordinate associated with the selected output waveguide and the detected position coordinate.

9. A system for processing an optical signal, comprising:
 a reflector operable to reflect an input optical signal to a selected one of a plurality of output waveguides and further operable to reflect a reference optical signal associated with the input optical signal;
 a detector operable to detect a position coordinate of the reference optical signal;
 a feedback module coupled to the detector and operable to generate a control signal based upon the detected position coordinate; and an actuator coupled to the reflector and operable to position the reflector in response to the control signal;

wherein:

the detector is further operable to generate a position signal comprising a first detection voltage and a second detection voltage, the first detection voltage representing the detected position of the reference optical signal measured along a first axis and the second detection voltage representing the detected position of the reference optical signal measured along a second axis;

the feedback module comprises a memory that stores an expected position coordinate for the reference optical signal, the expected position coordinate associated with the selected output waveguide and comprising a first expected voltage and a second expected voltage, the first expected voltage representing the expected position of the reference optical signal measured along the first axis and the second expected voltage representing the expected position of the reference optical signal measured along the second axis; and the control signal comprises a first control voltage determined in response to the difference between the first expected voltage and the first detection voltage, and a second control voltage determined in response to the difference between the second expected voltage and the second detection voltage.

10. The system of claim 9, wherein the actuator is operable to position the reflector along the first axis in response to the first control voltage and to position the reflector along the second axis in response to the second control voltage.

11. The system of claim 1, wherein:

the actuator is operable to place the reflector in an alignment position such that the light intensity of the input optical signal received by a particular one of the output waveguides reaches a predetermined threshold; and the feedback module comprises a memory operable to store an expected position coordinate for the reference optical signal, the expected position coordinate indexed by an identifier indicating the particular output waveguide and comprising information representing the position coordinate of the reference optical signal detected when the reflector was placed in the alignment position.

12. A method for processing an optical signal, comprising:

reflecting an input optical signal to a selected one of a plurality of output waveguides using a reflector having a concave reflective surface;

reflecting a reference optical signal using the reflector, wherein the reference optical signal is associated with the input optical signal;

detecting a position coordinate of the reference optical signal;

generating a control signal based upon the detected position coordinate; and positioning the reflector in response to the control signal.

13. The method of claim 12, wherein the input optical signal comprises a diverging optical beam and the step of reflecting the input optical signal comprises reflecting the input optical signal such that the input optical signal converges toward the selected output waveguide.

14. The method of claim 12, further comprising:

collimating the input optical signal prior to reflecting the input optical signal; and decollimating the input optical signal subsequent to reflecting the input optical signal such that the input optical signal focuses toward the selected output waveguide.

15. The method of claim 12, wherein the output waveguides comprise optical fibers.

16. The method of claim 12, wherein the reference optical signal comprises an optical beam having a predetermined angular correspondence to the input optical signal.

17. The method of claim 12, wherein the step of detecting further comprises:

detecting the position of the reference optical signal along a first axis; and detecting the position of the reference optical signal along a second axis.

18. The method of claim 12, further comprising storing a plurality of expected position coordinates for the reference optical signal, each expected position coordinate associated with a particular one of the output waveguides, wherein the step of generating comprises generating the control signal based upon the expected position coordinate associated with the selected output waveguide and the detected position coordinate.

19. A method for processing an optical signal, comprising:

reflecting an input optical signal to a selected one of a plurality of output waveguides using a reflector;

reflecting a reference optical signal using the reflector, wherein the reference optical signal is associated with the input optical signal;

detecting a position coordinate of the reference optical signal;

generating a control signal based upon the detected position coordinate;

positioning the reflector in response to the control signal;

generating a position signal comprising a first detection voltage and a second detection voltage, the first detection voltage representing the detected position of the reference optical signal measured along a first axis and the second detection voltage representing the detected position of the reference optical signal measured along a second axis; and storing an expected position coordinate for the reference optical signal, the expected position coordinate associated with the selected output waveguide and comprising a first expected voltage and a second expected voltage, the first expected voltage representing the expected position of the reference optical signal measured along the first axis and the second expected voltage representing the expected position of the reference optical signal measured along the second axis;

wherein the control signal comprises a first control voltage determined in response to the difference between the first expected voltage and the first detection voltage, and a second control voltage determined in response to the difference between the second expected voltage and the second detection voltage.

20. The method of claim 19, wherein the step of positioning comprises positioning the reflector along the first axis in response to the first control voltage and positioning the reflector along the second axis in response to the second control voltage.

21. The method of claim 12, further comprising:

placing the reflector in an alignment position such that the light intensity of the input optical signal received by a particular one of the output waveguides reaches a predetermined threshold; and storing an expected position coordinate for the reference optical signal, the expected position coordinate indexed by an identifier indicating the particular output waveguide and comprising information representing the position of the reference optical signal detected when the reflector was placed in the alignment position.

22. The system of claim 9, further comprising a refractive material operable to collimate the input optical signal for reflection by the reflector and further operable to decollimate the input optical signal reflected by the reflector such that the input optical signal focuses toward the selected output waveguide.

23. The system of claim 9, wherein:

the input optical signal comprises a diverging optical beam; and the reflector comprises a concave surface operable to reflect the input optical signal such that the input optical signal converges toward the selected output waveguide.

24. The system of claim 9, wherein the concave surface further comprises a reflective coating operable to reflect the input optical signal.

25. The method of claim 19, further comprising:

collimating the input optical signal prior to reflecting the input optical signal; and decollimating the input optical signal subsequent to reflecting the input optical signal such that the input optical signal focuses toward the selected output waveguide.

26. The method of claim 19, wherein the input optical signal comprises a diverging optical beam and the step of reflecting the input optical signal comprises reflecting the input optical signal such that the input optical signal converges toward the selected output waveguide.

* * * * *